United States Patent
Ricci et al.

(10) Patent No.: US 11,290,587 B2
(45) Date of Patent: *Mar. 29, 2022

(54) DOCKING STATION FOR PORTABLE DEVICES PROVIDING AUTHORIZED POWER TRANSFER AND FACILITY ACCESS

(71) Applicant: Z124, George Town (KY)

(72) Inventors: Christopher P. Ricci, Saratoga, CA (US); Dennis J. Dupray, Golden, CO (US)

(73) Assignee: Z124, George Town (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/559,235

(22) Filed: Sep. 3, 2019

(65) Prior Publication Data
US 2020/0068060 A1 Feb. 27, 2020

Related U.S. Application Data

(63) Continuation of application No. 15/430,216, filed on Feb. 10, 2017, now abandoned, which is a continuation of application No. 15/156,122, filed on May 16, 2016, now Pat. No. 9,569,636, which is a continuation of application No. 13/708,718, filed on Dec. 7, 2012, now abandoned.

(60) Provisional application No. 61/568,954, filed on Dec. 9, 2011.

(51) Int. Cl.
| | |
|---|---|
| *H04M 1/724* | (2021.01) |
| *G06F 13/40* | (2006.01) |
| *G06F 21/62* | (2013.01) |
| *G06F 1/16* | (2006.01) |

(52) U.S. Cl.
CPC .......... *H04M 1/724* (2021.01); *G06F 1/1632* (2013.01); *G06F 13/4081* (2013.01); *G06F 21/6218* (2013.01); *G06F 2221/2137* (2013.01)

(58) Field of Classification Search
CPC . G06Q 20/3278; G06Q 20/327; H04W 12/06; G06F 1/1632; G06F 21/44
See application file for complete search history.

(56) References Cited

U.S. PATENT DOCUMENTS

| | | | |
|---|---|---|---|
| 5,325,046 A | 6/1994 | Young et al. | |
| 5,864,708 A * | 1/1999 | Croft | G06F 1/1632 370/521 |

(Continued)

OTHER PUBLICATIONS

"Dell Wireless Dock—D5000," Dell, © 2014, 2 pages [retrieved from: http://accessories.us.dell.com/sna/productdetail.aspx?c=us&l=en&cs=19&sku=332-1495].

(Continued)

*Primary Examiner* — Tae K Kim
(74) *Attorney, Agent, or Firm* — Sheridan Ross P.C.

(57) ABSTRACT

A docking station for docking portable electronic devices is disclosed. The docking station is configured to mechanically accept and operatively interface with the portable electronic device for non-contact charging and data transfer. The docking station can provide security features for providing and/or restricting access to computational facilities such as printers, databases, installed programs, etc. Such security features can include installing applications on such portable devices that limit access.

20 Claims, 7 Drawing Sheets

(56) References Cited

U.S. PATENT DOCUMENTS

| | | | | |
|---|---|---|---|---|
| 6,803,744 B1* | 10/2004 | Sabo | ............. | H02J 7/00302 320/108 |
| 7,352,567 B2* | 4/2008 | Hotelling | ............. | G06F 1/1632 312/223.2 |
| 7,627,343 B2 | 12/2009 | Fadell et al. | | |
| 7,715,187 B2* | 5/2010 | Hotelling | ............. | G06F 1/1632 361/679.41 |
| 7,719,830 B2 | 5/2010 | Howarth et al. | | |
| 7,916,467 B2* | 3/2011 | Hotelling | ............. | G06F 1/1632 361/679.41 |
| 7,999,417 B2* | 8/2011 | Kato | ............. | H01F 38/14 307/149 |
| 8,169,185 B2* | 5/2012 | Partovi | ............. | H02J 50/005 320/108 |
| 8,183,828 B2* | 5/2012 | Tanabe | ............. | H02J 50/60 320/108 |
| 8,305,036 B2* | 11/2012 | Toya | ............. | H02J 50/60 320/108 |
| 8,504,936 B2 | 8/2013 | Gimpl et al. | | |
| 8,527,892 B2 | 9/2013 | Sirpal et al. | | |
| 8,588,860 B2 | 11/2013 | Sirpal et al. | | |
| 8,599,106 B2 | 12/2013 | Gimpl et al. | | |
| 8,648,825 B2 | 2/2014 | Sirpal et al. | | |
| 8,659,565 B2 | 2/2014 | Sirpal et al. | | |
| 8,665,215 B2 | 3/2014 | Schrock et al. | | |
| 8,698,751 B2 | 4/2014 | Sirpal et al. | | |
| 8,773,378 B2 | 7/2014 | Sirpal et al. | | |
| 8,793,608 B2 | 7/2014 | Sirpal et al. | | |
| 8,832,577 B2 | 9/2014 | Sirpal et al. | | |
| 8,866,748 B2 | 10/2014 | Sirpal et al. | | |
| 8,866,763 B2 | 10/2014 | Sirpal et al. | | |
| 8,866,764 B2 | 10/2014 | Schrock | | |
| 8,872,731 B2 | 10/2014 | Gimpl et al. | | |
| 8,875,050 B2 | 10/2014 | Sirpal et al. | | |
| 8,881,053 B2 | 11/2014 | Sirpal et al. | | |
| 9,569,636 B2 | 2/2017 | Ricci et al. | | |
| 2004/0004460 A1* | 1/2004 | Fitch | ............. | H02J 13/0096 320/108 |
| 2004/0145342 A1* | 7/2004 | Lyon | ............. | H02J 50/90 320/108 |
| 2006/0284713 A1* | 12/2006 | Baarman | ............. | H01F 5/02 336/121 |
| 2007/0035917 A1* | 2/2007 | Hotelling | ............. | G06F 1/1632 361/679.56 |
| 2007/0293988 A1* | 12/2007 | Desmond | ............. | B82Y 30/00 700/245 |
| 2008/0067874 A1* | 3/2008 | Tseng | ............. | A61C 17/224 307/104 |
| 2008/0111518 A1* | 5/2008 | Toya | ............. | H02J 50/90 320/108 |
| 2008/0211320 A1* | 9/2008 | Cook | ............. | H02J 50/23 307/149 |
| 2008/0262292 A1* | 10/2008 | Abraham-Fuchs | .... | A61B 34/70 600/101 |
| 2008/0278899 A1* | 11/2008 | Hotelling | ............. | G06F 1/1632 361/679.41 |
| 2009/0051224 A1* | 2/2009 | Cook | ............. | H02J 50/20 307/104 |
| 2009/0069090 A1* | 3/2009 | Moser | ............. | G07F 17/3239 463/42 |
| 2009/0096413 A1* | 4/2009 | Partovi | ............. | H01F 38/14 320/108 |
| 2009/0153098 A1* | 6/2009 | Toya | ............. | H02J 7/0045 320/108 |
| 2009/0212637 A1* | 8/2009 | Baarman | ............. | H02J 5/005 307/104 |
| 2009/0212639 A1* | 8/2009 | Johnson | ............. | H02J 7/0044 307/104 |
| 2009/0224723 A1* | 9/2009 | Tanabe | ............. | H02J 50/10 320/108 |
| 2009/0253498 A1* | 10/2009 | Wolf | ............. | G07F 17/3239 463/29 |
| 2009/0278806 A1 | 11/2009 | Duarte et al. | | |
| 2010/0081473 A1* | 4/2010 | Chatterjee | ............. | H02J 50/80 455/559 |
| 2010/0083012 A1* | 4/2010 | Corbridge | ............. | H02J 50/80 713/300 |
| 2010/0131691 A1* | 5/2010 | Chatterjee | ............. | H04B 5/0031 710/303 |
| 2010/0146308 A1* | 6/2010 | Gioscia | ............. | H02J 50/10 713/300 |
| 2010/0177476 A1* | 7/2010 | Hotelling | ............. | G06F 1/1632 361/679.41 |
| 2010/0277121 A1* | 11/2010 | Hall | ............. | H03H 7/40 320/108 |
| 2011/0006611 A1* | 1/2011 | Baarman | ............. | H02J 7/025 307/104 |
| 2011/0106954 A1* | 5/2011 | Chatterjee | ............. | H04W 52/0245 709/227 |
| 2011/0131358 A1* | 6/2011 | Ganesh | ............. | H04M 1/72569 710/304 |
| 2011/0260681 A1* | 10/2011 | Guccione | ............. | H02J 50/80 320/108 |
| 2011/0298297 A1* | 12/2011 | van Wageningen | .... | H02J 5/005 307/104 |
| 2012/0081267 A1 | 4/2012 | Sirpal et al. | | |
| 2012/0081268 A1 | 4/2012 | Sirpal et al. | | |
| 2012/0081269 A1 | 4/2012 | De Paz | | |
| 2012/0081271 A1 | 4/2012 | Gimpl et al. | | |
| 2012/0081289 A1 | 4/2012 | Sirpal et al. | | |
| 2012/0081303 A1 | 4/2012 | Cassar et al. | | |
| 2012/0081306 A1 | 4/2012 | Sirpal et al. | | |
| 2012/0081307 A1 | 4/2012 | Sirpal et al. | | |
| 2012/0081308 A1 | 4/2012 | Sirpal | | |
| 2012/0081309 A1 | 4/2012 | Sirpal et al. | | |
| 2012/0081310 A1 | 4/2012 | Schrock | | |
| 2012/0081313 A1 | 4/2012 | Sirpal et al. | | |
| 2012/0081314 A1 | 4/2012 | Sirpal et al. | | |
| 2012/0081315 A1 | 4/2012 | Sirpal | | |
| 2012/0081317 A1 | 4/2012 | Sirpal et al. | | |
| 2012/0081318 A1 | 4/2012 | Sirpal et al. | | |
| 2012/0081319 A1 | 4/2012 | Gimpl et al. | | |
| 2012/0081323 A1 | 4/2012 | Sirpal et al. | | |
| 2012/0081397 A1 | 4/2012 | De Paz | | |
| 2012/0081398 A1 | 4/2012 | Sirpal et al. | | |
| 2012/0081399 A1 | 4/2012 | Sirpal et al. | | |
| 2012/0081400 A1 | 4/2012 | Schrock et al. | | |
| 2012/0081401 A1 | 4/2012 | Sirpal et al. | | |
| 2012/0081403 A1 | 4/2012 | Sirpal et al. | | |
| 2012/0081854 A1 | 4/2012 | Sirpal et al. | | |
| 2012/0084673 A1 | 4/2012 | Sirpal et al. | | |
| 2012/0084674 A1 | 4/2012 | Visosky | | |
| 2012/0084675 A1 | 4/2012 | Sirpal et al. | | |
| 2012/0084676 A1 | 4/2012 | De Paz | | |
| 2012/0084677 A1 | 4/2012 | Sirpal et al. | | |
| 2012/0084678 A1 | 4/2012 | Sirpal et al. | | |
| 2012/0084679 A1 | 4/2012 | Sirpal et al. | | |
| 2012/0084680 A1 | 4/2012 | Gimpl et al. | | |
| 2012/0084681 A1 | 4/2012 | Cassar | | |
| 2012/0084682 A1 | 4/2012 | Sirpal et al. | | |
| 2012/0084686 A1 | 4/2012 | Sirpal et al. | | |
| 2012/0084687 A1 | 4/2012 | Sirpal et al. | | |
| 2012/0084693 A1 | 4/2012 | Sirpal et al. | | |
| 2012/0084698 A1 | 4/2012 | Sirpal et al. | | |
| 2012/0084699 A1 | 4/2012 | Sirpal et al. | | |
| 2012/0084700 A1 | 4/2012 | Sirpal et al. | | |
| 2012/0084701 A1 | 4/2012 | Sirpal et al. | | |
| 2012/0084709 A1 | 4/2012 | Sirpal et al. | | |
| 2012/0084710 A1 | 4/2012 | Sirpal et al. | | |
| 2012/0084712 A1 | 4/2012 | Gimpl et al. | | |
| 2012/0084714 A1 | 4/2012 | Sirpal et al. | | |
| 2012/0084715 A1 | 4/2012 | Sirpal et al. | | |
| 2012/0084716 A1 | 4/2012 | Sirpal et al. | | |
| 2012/0084718 A1 | 4/2012 | Gimpl et al. | | |
| 2012/0084719 A1 | 4/2012 | Sirpal et al. | | |
| 2012/0084720 A1 | 4/2012 | Sirpal et al. | | |
| 2012/0084721 A1 | 4/2012 | Gimpl et al. | | |
| 2012/0084722 A1 | 4/2012 | Cassar et al. | | |
| 2012/0084723 A1 | 4/2012 | Reeves et al. | | |
| 2012/0084724 A1 | 4/2012 | Sirpal et al. | | |
| 2012/0084725 A1 | 4/2012 | Sirpal et al. | | |

(56) References Cited

U.S. PATENT DOCUMENTS

| | | | |
|---|---|---|---|
| 2012/0084726 A1 | 4/2012 | Sirpal et al. | |
| 2012/0084739 A1 | 4/2012 | Sirpal et al. | |
| 2012/0105363 A1 | 5/2012 | Sirpal et al. | |
| 2012/0112552 A1* | 5/2012 | Baarman | H01F 38/14 307/104 |
| 2012/0117495 A1 | 5/2012 | Sirpal | |
| 2012/0124490 A1 | 5/2012 | Sirpal et al. | |
| 2012/0144323 A1 | 6/2012 | Sirpal et al. | |
| 2012/0146575 A1* | 6/2012 | Armstrong | H01F 38/14 320/108 |
| 2012/0153894 A1* | 6/2012 | Widmer | H02J 50/60 320/108 |
| 2012/0174028 A1 | 7/2012 | Sirpal et al. | |
| 2012/0202427 A1* | 8/2012 | Gioscia | H04B 5/0031 455/41.2 |
| 2012/0206097 A1* | 8/2012 | Soar | H04K 3/25 320/108 |
| 2012/0246374 A1* | 9/2012 | Fino | H02J 7/025 710/303 |
| 2012/0324135 A1* | 12/2012 | Goodman | G06F 1/1632 710/304 |
| 2013/0198867 A1 | 8/2013 | Ricci et al. | |
| 2013/0234481 A1* | 9/2013 | Johnson | H02J 7/025 297/217.3 |
| 2014/0184147 A1* | 7/2014 | Uchida | H02J 7/00302 320/107 |
| 2014/0300317 A1* | 10/2014 | Kim | H02J 7/007 320/108 |
| 2014/0313663 A1* | 10/2014 | Ashcraft | G06F 1/1632 361/679.44 |
| 2017/0249474 A1 | 8/2017 | Ricci et al. | |

OTHER PUBLICATIONS

Google Image Result for Fujitsu Dual Screen Phone, published date unknown, [retrieved Apr. 18, 2011], 1 page. Retrieved from: www.google.com/imgres?imgurl=http://www.computerriver.com/images/dual-screen-phone.jpg.

Google Image Result for LG Dual Touch Screen Concept Phone by Eugene Kim, published date unknown, [retrieved Apr. 18, 2011], 1 page. Retrieved from: www.google.com/imgres?imgurl=http://fgadgets.com/wp-content/uploads/2010/08/lg-dual-touch-screen-phone-Eugene-Kim-01.jpg.

Google Image Result for Fujitsu Dual Screen Phone, published date unknown, [retrieved Apr. 18, 2011], 1 page. Retrieved from: www.google.com/imgres?imgurl=http://www.gsmdome.com/wp-content/uploads/2010/10/fujitsu-dual-screen-phone_w2cP7_54.jpg.

Google Image Result for Kyocera Echo, published date unknown, [retrieved Apr. 18, 2011], 1 page. Retrieved from: www.google.com/imgres?imgurl=http://www.hardwaresphere.com/wp-content/uploads/2011/02/kyocera-echo-dual-screen-android-phone-for-sprint-network.jpg.

Google Image Result for HTC Triple Viper, published date unknown, [retrieved Apr. 18, 2011], 1 page. Retrieved from: www.google.com/imgres?imgurl=http://www.santafemods.com/Forum/AndroidForums/htcTripleViper.png.

Google Image Result for Dual-Screen Phone, [retrieved Apr. 18, 2011], 1 page. Retrieved from: www.google.com/imgres?imgurl=http://www.netshet.org/wp-content/uploads/2011/02/Dual-Scree . . . .

Website entitled "Lapdock™ for Motorola Atrix," Motorola Mobility, Inc, 2011, [retrieved on Apr. 18, 2011], 1 page. Retrieved from: www.motorola.com/Consumers/US-EN/Consumer-Product-and-Services/Mobile+Ph . . . .

Website entitled "Motorola ATRIX 4G Laptop Dock Review," phoneArena.com, posted Mar. 2, 2011, [retrieved on Apr. 18, 2011], 6 pages. Retrieved from: www.phonearena.com/reviews/Motorola-ATRIX-4G-Laptop-Dock-Review_id2667.

Burns, C., "Motorola ATRIX 4G Laptop Dock Review," Android Community, Feb. 20, 2011, [retrieved on Apr. 18, 2011], 5 pages. Retrieved from: www.androidcommunity.com/motorola-atrix-4g-laptop-dock-review-20110220/.

Catacchio, "This smartphone has two huge screens . . . that rotate," The Next Web, Inc., Oct. 7, 2010, [retrieved on Jul. 21, 2011], 2 pages. Retrieved from: www.thenextweb.com/asia/2010/10/07/this-smartphone-has-two-huge-screens-that-rotate/.

Posted by Harman03, "Kyocera Echo Dual-screen Android Phone," posted 4 weeks from Apr. 18, 2011, [retrieved on Apr. 18, 2011], 3 pages. Retrieved from: www.unp.me/f106/kyocera-echo-dual-screen-android-phone-143800/.

Stein, S., "How does the Motorola Atrix 4G Lapdock compare with a laptop?" Crave—CNET, Feb. 9, 2011 [retrieved on Apr. 18, 2011], 7 pages. Retrieved from: www.news.cnet.com/8301-17938_105-20031251-1.html.

Official Action for U.S. Appl. No. 13/708,718, dated Aug. 1, 2014 16 pages.

Official Action for U.S. Appl. No. 13/708,718, dated Feb. 26, 2015 20 pages.

Official Action for U.S. Appl. No. 13/708,718, dated Jul. 7, 2015 26 pages.

Official Action for U.S. Appl. No. 13/708,718, dated Feb. 16, 2016 36 pages.

Notice of Allowance for U.S. Appl. No. 15/156,122, dated Sep. 29, 2016 13 pages.

Official Action for U.S. Appl. No. 15/430,216, dated Oct. 6, 2017, 13 pages.

Official Action for U.S. Appl. No. 15/430,216, dated Apr. 23, 2018, 14 pages.

Official Action for U.S. Appl. No. 15/430,216, dated Sep. 17, 2018, 14 pages.

Final Action for U.S. Appl. No. 15/430,216, dated May 2, 2019, 14 pages.

* cited by examiner

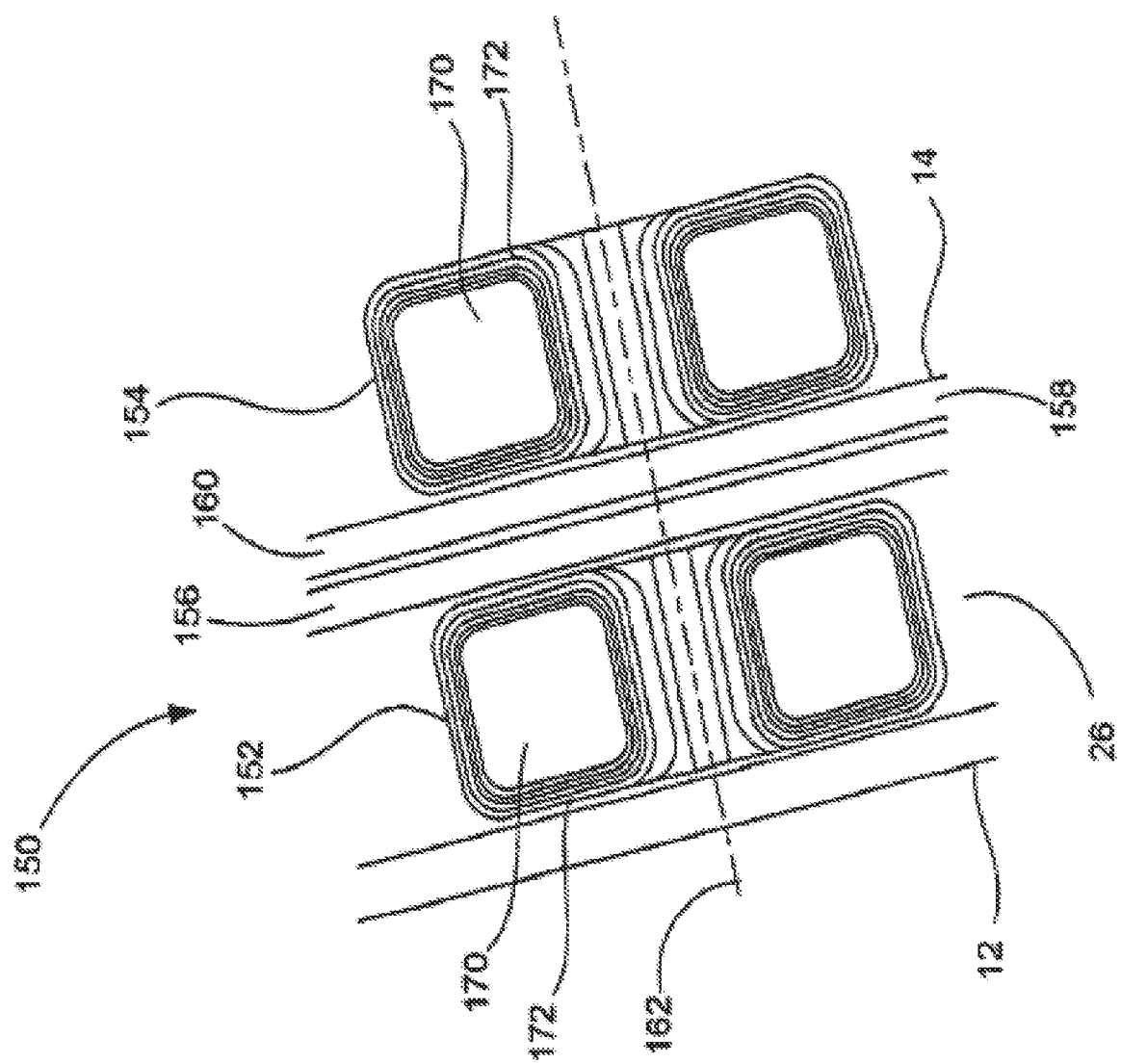

DOCKING STATION FOR PORTABLE DEVICES PROVIDING AUTHORIZED POWER TRANSFER AND FACILITY ACCESS

CROSS REFERENCE TO RELATED APPLICATIONS

The present application is a continuation of and claims priority to U.S. patent application Ser. No. 15/430,216, filed Feb. 10, 2017, entitled "Docking Station for Portable Devices Providing Authorized Power Transfer and Facility Access," which is a continuation of and claims priority to U.S. patent application Ser. No. 15/156,122, filed on May 16, 2016, entitled "Docking Station for Portable Devices Providing Authorized Power Transfer and Facility Access," now U.S. Pat. No. 9,569,636, which is a continuation of and claims priority to U.S. patent application Ser. No. 13/708,718, filed Dec. 7, 2012, of the same title, which claims priority to U.S. Provisional Patent Application No. 61/568,954, filed on Dec. 9, 2011. The present application is also related to U.S. patent application Ser. No. 10/423,490, filed Apr. 25, 2003; Ser. No. 11/125,883, filed May 9, 2005; as well as, U.S. patent application Ser. No. 13/248,578, filed Sep. 29, 2011; Ser. No. 13/249,056, filed Sep. 29, 2011; Ser. No. 13/223,778, filed Sep. 1, 2011; Ser. No. 13/223,039, filed Aug. 31, 2011; Ser. No. 13/223,043, filed Aug. 31, 2011; PCT/US11/53924, filed Sep. 29, 2011; Ser. No. 13/247,815, filed Sep. 28, 2011; Ser. No. 13/248,496, filed Sep. 29, 2011; Ser. No. 13/248,427, filed Sep. 29, 2011; Ser. No. 13/222,970, filed Aug. 31, 2011; PCT/US11/53805, filed Sep. 29, 2011; Ser. No. 13/248,138, filed Sep. 29, 2011; PCT/US11/53953, filed Sep. 29, 2011; Ser. No. 13/223,848, filed Sep. 1, 2011; PCT/US11/53806, filed Sep. 29, 2011; Ser. No. 13/248,188, filed Sep. 29, 2011; PCT/US11/53929, filed Sep. 29, 2011; Ser. No. 13/248,228, filed Sep. 29, 2011; PCT/US11/53945, filed Sep. 29, 2011; Ser. No. 13/247,808, filed Sep. 28, 2011; PCT/US11/53851, filed Sep. 29, 2011; Ser. No. 13/248,275, filed Sep. 29, 2011; PCT/US11/53939, filed Sep. 29, 2011; Ser. No. 13/222,921, filed Aug. 31, 2011; PCT/US11/53861, filed Sep. 29, 2011; Ser. No. 13/223,015, filed Aug. 31, 2011; PCT/US11/53855, filed Sep. 29, 2011; Ser. No. 13/247,817, filed Sep. 28, 2011; PCT/US11/53849, filed Sep. 29, 2011; Ser. No. 13/222,910, filed Aug. 31, 2011; PCT/US11/53844, filed Sep. 29, 2011; Ser. No. 13/247,982, filed Sep. 28, 2011; PCT/US11/53942, filed Sep. 29, 2011; Ser. No. 13/247,977, filed Sep. 28, 2011; PCT/US11/53937, filed Sep. 29, 2011; Ser. No. 13/247,971, filed Sep. 28, 2011; PCT/US11/53948, filed Sep. 29, 2011; Ser. No. 13/247,325, filed Sep. 28, 2011; PCT/US11/53889, filed Sep. 29, 2011; Ser. No. 13/247,345, filed Sep. 28, 2011; PCT/US11/53893, filed Sep. 29, 2011; Ser. No. 13/248,305, filed Sep. 29, 2011; PCT/US11/53933, filed Sep. 29, 2011; Ser. No. 13/247,735, filed Sep. 28, 2011; PCT/US11/53919, filed Sep. 29, 2011; Ser. No. 13/247,739, filed Sep. 28, 2011; PCT/US11/53917, filed Sep. 29, 2011; Ser. No. 13/248,714, filed Sep. 29, 2011; Ser. No. 13/248,544, filed Sep. 29, 2011; Ser. No. 13/249,014, filed Sep. 29, 2011; Ser. No. 13/249,103, filed Sep. 29, 2011; Ser. No. 13/247,402, filed Sep. 28, 2011; PCT/US11/53891, filed Sep. 29, 2011; Ser. No. 13/247,749, filed Sep. 28, 2011; Ser. No. 13/249,040, filed Sep. 29, 2011; Ser. No. 13/247,480, filed Sep. 28, 2011; Ser. No. 13/247,359, filed Sep. 28, 2011; PCT/US11/53884, filed Sep. 29, 2011; Ser. No. 13/222,902, filed Aug. 31, 2011; PCT/US11/53839, filed Aug. 29, 2011; Ser. No. 13/247,787, filed Sep. 28, 2011; PCT/US11/53914, filed Sep. 29, 2011; Ser. No. 13/247,797, filed Sep. 28, 2011; PCT/US11/53902, filed Sep. 29, 2011; Ser. No. 13/247,311, filed Sep. 28, 2011; PCT/US11/54032, filed Sep. 29, 2011; Ser. No. 13/247,823, filed Sep. 28, 2011; Ser. No. 13/222,888, filed Aug. 31, 2011; Ser. No. 13/247,514, filed Sep. 28, 2011; Ser. No. 13/223,747, filed Sep. 1, 2011; PCT/US11/53771, filed Sep. 28, 2011; Ser. No. 13/223,674, filed Sep. 1, 2011; PCT/US11/53773, filed Sep. 28, 2011; Ser. No. 13/247,822, filed Sep. 28, 2011; Ser. No. 13/247,741, filed Sep. 28, 2011; PCT/US11/53905, filed Sep. 29, 2011; Ser. No. 13/247,744, filed Sep. 28, 2011; PCT/US11/53896, filed Sep. 29, 2011; Ser. No. 13/247,824, filed Sep. 28, 2011; Ser. No. 13/247,751, filed Sep. 28, 2011; PCT/US11/53880, filed Sep. 29, 2011; Ser. No. 13/247,827, filed Sep. 28, 2011; Ser. No. 13/247,829, filed Sep. 28, 2011; Ser. No. 13/247,839, filed Sep. 28, 2011; PCT/US11/53875, filed Sep. 29, 2011; Ser. No. 13/247,836, filed Sep. 28, 2011; Ser. No. 13/223,809, filed Sep. 1, 2011; PCT/US11/53776, filed Sep. 28, 2011; Ser. No. 13/223,727, filed Sep. 1, 2011; PCT/US11/53779, filed Sep. 28, 2011; Ser. No. 13/223,697, filed Sep. 1, 2011; PCT/US11/53781, filed Sep. 28, 2011; Ser. No. 13/247,369, filed Sep. 28, 2011; PCT/US11/53963, filed Sep. 29, 2011; Ser. No. 13/247,708, filed Sep. 28, 2011; Ser. No. 13/247,719, filed Sep. 28, 2011; Ser. No. 13/247,728, filed Sep. 28, 2011; Ser. No. 13/247,388, filed Sep. 28, 2011; PCT/US11/53898, filed Sep. 29, 2011; Ser. No. 13/248,199, filed Sep. 29, 2011; Ser. No. 13/248,450, filed Sep. 29, 2011; Ser. No. 13/247,955, filed Sep. 28, 2011; PCT/US11/53951, filed Sep. 29, 2011; Ser. No. 13/247,949, filed Sep. 28, 2011; PCT/US11/53960, filed Sep. 29, 2011; Ser. No. 13/247,801, filed Sep. 28, 2011; PCT/US11/53906, filed Sep. 29, 2011; Ser. No. 13/247,581, filed Sep. 28, 2011; PCT/US11/54039, filed Sep. 29, 2011; Ser. No. 13/247,606, filed Sep. 28, 2011; PCT/US11/54046, filed Sep. 29, 2011; Ser. No. 13/247,621, filed Sep. 28, 2011; PCT/US11/54042, filed Sep. 29, 2011; Ser. No. 13/247,634, filed Sep. 28, 2011; Ser. No. 13/248,618, filed Sep. 29, 2011; Ser. No. 13/247,647, filed Sep. 28, 2011; Ser. No. 13/247,663, filed Sep. 28, 2011; Ser. No. 13/247,696, filed Sep. 28, 2011; Ser. No. 13/247,711, filed Sep. 28, 2011; Ser. No. 13/247,724, filed Sep. 28, 2011; Ser. No. 13/247,733, filed Sep. 28, 2011; Ser. No. 13/248,665, filed Sep. 29, 2011; and Ser. No. 13/223,056, filed Aug. 31, 2011. All of the applications listed above are hereby incorporated by reference, in their entirety, for all that they teach and for all purposes.

BACKGROUND

Many electronic devices can connect to a docking station for providing a convenient interface for transferring data between the electronic device and other devices, such as a computers, speakers, monitors, and printers. The docking station may also include an interface for connecting to a power source so that the electronic device can be powered or charged (e.g., battery charge replenishment). In most cases, the docking stations include a cavity within which the electronic device is received. The cavity is configured to have a size and shape that coincides with the size and shape of the electronic device so that the electronic device rests snuggly within the cavity. Furthermore, the cavity typically includes a connector therein for operatively engaging a port of the electronic device when the electronic device is positioned within the cavity. The connector is typically coupled to the external systems (e.g., a computer, a power source, etc.) through a cable so that communications between the electronic device and the external systems can take place.

Recently, inductive charging units have been implemented in electronic devices, the most famous of which is the Sonic Care toothbrush manufactured by Philips of the Netherlands. The toothbrush and the charging dock form the two part transformer with the primary induction coil contained in the dock and the secondary induction coil contained in the toothbrush. When the end of toothbrush is placed in a cavity of the dock, the complete transform is created and the induced current in the secondary coil charges the battery.

Inductive charging pads have also been developed. The pad works similar to the toothbrush, however, the pad typically includes multiple transformers so that the electronic device can be placed in any orientation on the pad. When the electronic device is placed on the pad, one of the transformers of the pad induces current in the transformer of the electronic device, and this current charges the battery of the electronic device. Unfortunately, the efficiency of the transform is not very good since the transformer located on the electronic device typically does not align with the transformers of the pad, i.e., does not create a closed magnetic loop and therefore there is no direct inductive coupling. Unfortunately, current docking systems have not integrated charging and communication systems into a non-connective system for docking devices.

SUMMARY OF THE PRESENT DISCLOSURE

The present disclosure relates to a docking system including a dock and a portable electronic device. The dock can include various wireless and/or non-contact features for communicating with the portable electronic device, such as a mobile phone, for exchanging data and/or charging the batteries of the portable electronic device.

The portable electronic device (also denoted "portable device" herein) can include a front side and substantially planar back side opposite the front side. A screen or display may be position on the front side, and a power transfer mechanism may be positioned at the substantially planar back side. The screen or display can be configured to display content in an upright manner whether the portable electronic device is used horizontally or vertically. Additionally, the portable device may be foldable or bendable such that in one configuration, the front side and the back side may each face in the same direction.

The docking system also includes a dock (also referred to as a docking platform or docking station) having a substantially planar front side configured to support the substantially planar backside of the portable electronic device thereon, and including a power transfer mechanism at the substantially planar front side. The power transfer mechanism of the portable electronic device and power transfer mechanism of the docking platform are aligned along an axis and juxtaposed relative to one another when the portable electronic device is supported by the docking platform. The power transfer mechanism of the portable electronic device and the power transfer mechanism of the docking platform are rotationally symmetric about the axis such that they maintain communication with one another independently of how the portable electronic device is otherwise placed on the docking platform.

The present disclosure relates to a docking station. The docking station includes a platform that allows a substantially planar portable electronic device to be docked thereto. The docking station also includes an interface mechanism located at the platform and configured to interface with a corresponding interface mechanism of the portable electronic device when the portable electronic device is docked to the platform so that a plurality of electronic devices may be provided communications with a docked portable electronic device. In particular, the docketing station may provide data transfer capabilities between the docked portable electronic device and one or more printers, one or more household appliances, one or more vehicles (e.g., an automobile). In particular, the docketing station may include a plurality of communication ports (e.g., a port replicator) for concurrently communicating wirelessly with a plurality of computational devices (e.g., printers, scanners, navigation systems, household appliances, etc.). Moreover, the docking station may include a plurality of wireless (or non-contact) communication channels that can be keyed or uniquely accessed by particular portable electronic device, e.g., a mobile phone, or laptop computer. In particular, the docketing station may include authentication features for determining access rights (if any) for a portable electronic device placed thereon. For example, when positioned on the docketing station, a non-authenticated portable device may only be able to be, e.g., recharged (via, e.g., inductive charging), while a first authenticated portable device may be able to access a first file system and a first printer, while a second authenticated portable device may be able to access both the first file system, a second file system, a corporate database, and all corporate printers via the docking station.

The present disclosure also relates to a docking station that may include a substantially planar platform for receiving a substantially planar portable electronic device thereon. The docking station also includes an interface mechanism disposed in the substantially planar platform for performing inductive charging of one or more portable devices, e.g., two or more such portable devices concurrently. The interface mechanism communicates with a corresponding interface mechanism disposed in the substantially planar portable electronic device when the substantially planar portable electronic device is placed on the substantially planar platform. The docking station further includes one or more alignment features for aligning a center of the corresponding interface mechanism of the substantially planar portable electronic device with the axis when the substantially planar portable electronic device is placed on the substantially planar platform in any of the plurality of orientations.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "desktop" refers to a metaphor used to portray systems. A desktop is generally considered a "surface" that typically includes pictures, called icons, widgets, folders, etc. that can activate show applications, windows, cabinets, files, folders, documents, and other graphical items. The icons are generally selectable to initiate a task through user interface interaction to allow a user to execute applications or conduct other operations.

The term "hand-held," as used herein, can mean an electronic device that is general operated while being held in a hand of a person.

The term "screen," "touch screen," or "touchscreen" refers to a physical structure that includes one or more hardware components that provide the device with the ability to render a user interface and/or receive user input. A screen can encompass any combination of gesture capture region, a touch sensitive display, and/or a configurable area. The device can have one or more physical screens embedded in the hardware. However a screen may also include an external peripheral device that may be attached and detached from the device. In embodiments, multiple external devices may be attached to the device. Thus, in embodiments, the screen can enable the user to interact with the device by touching areas on the screen and provides information to a user through a display. The touch screen may sense user contact in a number of different ways, such as by a change in an electrical parameter (e.g., resistance or capacitance), acoustic wave variations, infrared radiation proximity detection, light variation detection, and the like. In a resistive touch screen, for example, normally separated conductive and resistive metallic layers in the screen pass an electrical current. When a user touches the screen, the two layers make contact in the contacted location, whereby a change in electrical field is noted and the coordinates of the contacted location calculated. In a capacitive touch screen, a capacitive layer stores electrical charge, which is discharged to the user upon contact with the touch screen, causing a decrease in the charge of the capacitive layer. The decrease is measured, and the contacted location coordinates determined. In a surface acoustic wave touch screen, an acoustic wave is transmitted through the screen, and the acoustic wave is disturbed by user contact. A receiving transducer detects the user contact instance and determines the contacted location coordinates.

The term "display" refers to a portion of one or more screens used to display the output of a computer to a user. A display may be a single-screen display or a multi-screen display, referred to as a composite display. A composite display can encompass the touch sensitive display of one or more screens. A single physical screen can include multiple displays that are managed as separate logical displays. Thus, different content can be displayed on the separate displays although part of the same physical screen.

The term "displayed image" refers to an image produced on the display. A typical displayed image is a window or desktop. The displayed image may occupy all or a portion of the display.

The term "display orientation" refers to the way in which a rectangular display is oriented by a user for viewing. The two most common types of display orientation are portrait and landscape. In landscape mode, the display is oriented such that the width of the display is greater than the height of the display (such as a 4:3 ratio, which is 4 units wide and 3 units tall, or a 16:9 ratio, which is 16 units wide and 9 units tall). Stated differently, the longer dimension of the display is oriented substantially horizontal in landscape mode while the shorter dimension of the display is oriented substantially vertical. In the portrait mode, by contrast, the display is oriented such that the width of the display is less than the height of the display. Stated differently, the shorter dimension of the display is oriented substantially horizontal in the portrait mode while the longer dimension of the display is oriented substantially vertical.

The term "composite display" refers to a logical structure that defines a display that can encompass one or more screens. A multi-screen display can be associated with a composite display that encompasses all the screens. The composite display can have different display characteristics based on the various orientations of the device.

The term "gesture" refers to a user action that expresses an intended idea, action, meaning, result, and/or outcome. The user action can include manipulating a device (e.g., opening or closing a device, changing a device orientation, moving a trackball or wheel, etc.), movement of a body part in relation to the device, movement of an implement or tool in relation to the device, audio inputs, etc. A gesture may be made on a device (such as on the screen) or with the device to interact with the device.

The term "module" as used herein refers to any known or later developed hardware, software, firmware, artificial intelligence, fuzzy logic, or combination of hardware and software that is capable of performing the functionality associated with that element.

The term "gesture capture" refers to a sense or otherwise a detection of an instance and/or type of user gesture. The gesture capture can occur in one or more areas of the screen, A gesture region can be on the display, where it may be referred to as a touch sensitive display or off the display where it may be referred to as a gesture capture area.

A "multi-screen application" or "multiple-display application" refers to an application that is capable of multiple modes. The multi-screen application mode can include, but is not limited to, a single screen mode (where the application is displayed on a single screen) or a composite display mode (where the application is displayed on two or more screens). A multi-screen application can have different layouts optimized for the mode. Thus, the multi-screen application can have different layouts for a single screen or for a composite display that can encompass two or more screens. The different layouts may have different screen/display dimensions and/or configurations on which the user interfaces of the multi-screen applications can be rendered. The different layouts allow the application to optimize the application's user interface for the type of display, e.g., single screen or multiple screens. In single screen mode, the multi-screen application may present one window pane of information. In a composite display mode, the multi-screen application may present multiple window panes of information or may provide a larger and a richer presentation because there is more space for the display contents. The multi-screen applications may be designed to adapt dynamically to changes in the device and the mode depending on which display (single or composite) the system assigns to the multi-screen application. In alternative embodiments, the user can use a gesture to request the application transition to a different mode, and, if a display is available for the requested mode, the device can allow the application to move to that display and transition modes.

A "single-screen application" refers to an application that is capable of single screen mode. Thus, the single-screen application can produce only one window and may not be capable of different modes or different display dimensions. A single-screen application may not be capable of the several modes discussed with the multi-screen application.

The term "window" refers to a, typically rectangular, displayed image on at least part of a display that contains or provides content different from the rest of the screen. The window may obscure the desktop.

The terms "determine", "calculate" and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

BRIEF DESCRIPTION OF THE DRAWINGS

The present disclosure will be readily understood by the following detailed description in conjunction with the accompanying drawings, wherein like reference numerals designate like structural elements, and in which:

FIG. 3 is a side elevation view, in cross section, of an interface system that uses inductive coils, in accordance with embodiments of the present disclosure.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION OF THE PRESENT DISCLOSURE

The present disclosure generally pertains to a docking system that includes a docking station for communicating with a portable electronic device. By way of example, the portable electronic device may include a display that displays content one a first side, or if the device is foldable may display content on two panels thereof wherein the panels face in a same direction in a first configuration and face in opposite directions in a second configuration (e.g., when the portable device is folded).

One aspect of the present disclosure relates to techniques for efficiently and securely transferring data and/or power between a portable device and the docking station. The mechanisms used to transfer data and/or power support are dependent upon various security and authentication techniques for determining access rights, which the docking station can provide. Optionally/additionally, the docking station may be used to authorize a portable device for accessing certain remote computational equipment. For example, a docking station at a user's house or a business site may be used to authenticate the user's portable device to allow access to a remotely located database or server computer.

A docking station and portable device are shown in the appended Figures. However, it is worthwhile to note that the detailed description given herein with respect to these figures is for explanatory purposes since the scope of the present disclosure extends beyond these limited embodiments.

Figure 1A:
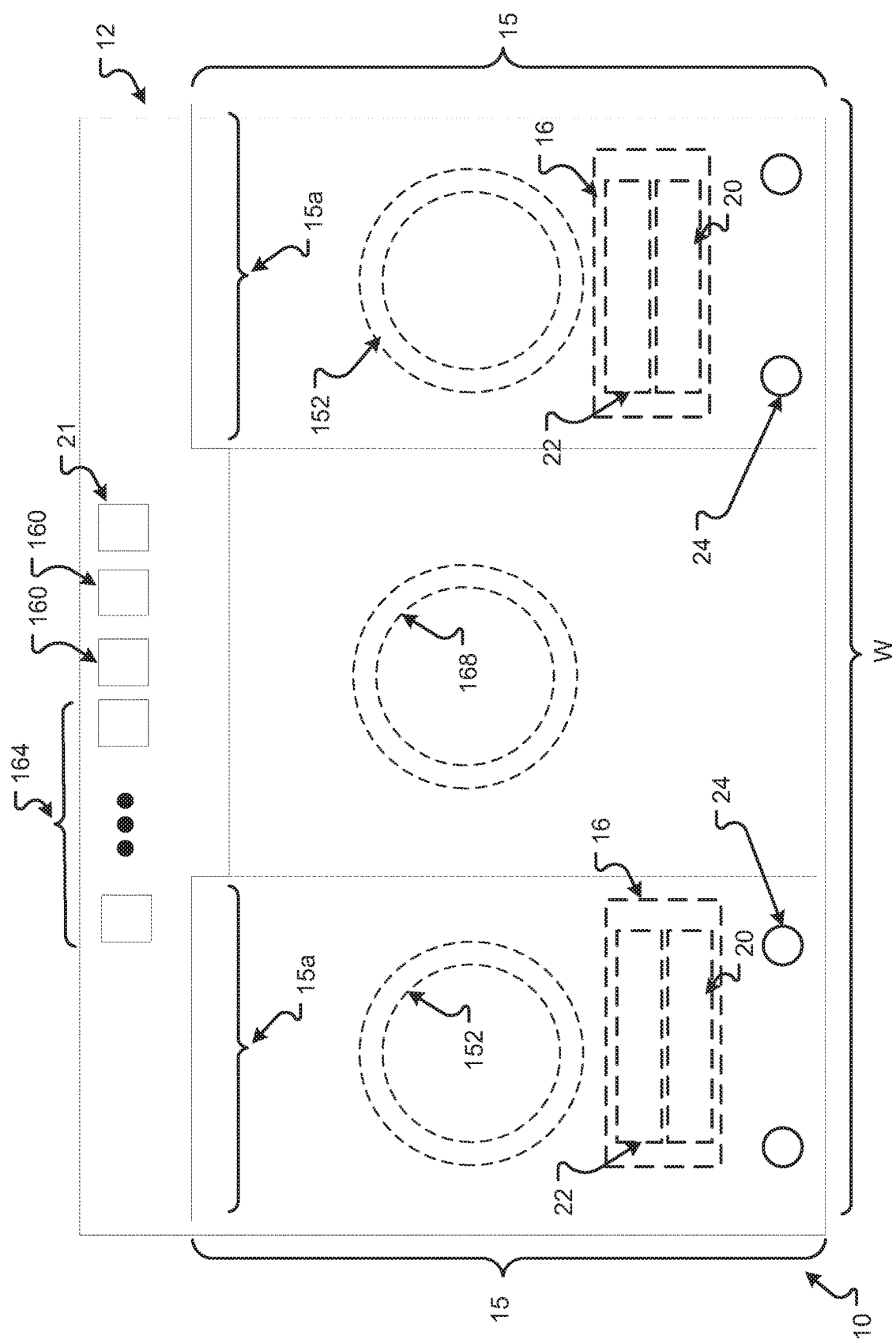
FIG. 1A shows a simplified diagram of a docking system 10, having a docking station 12, in accordance with embodiments of the present disclosure.
Figure 1B:
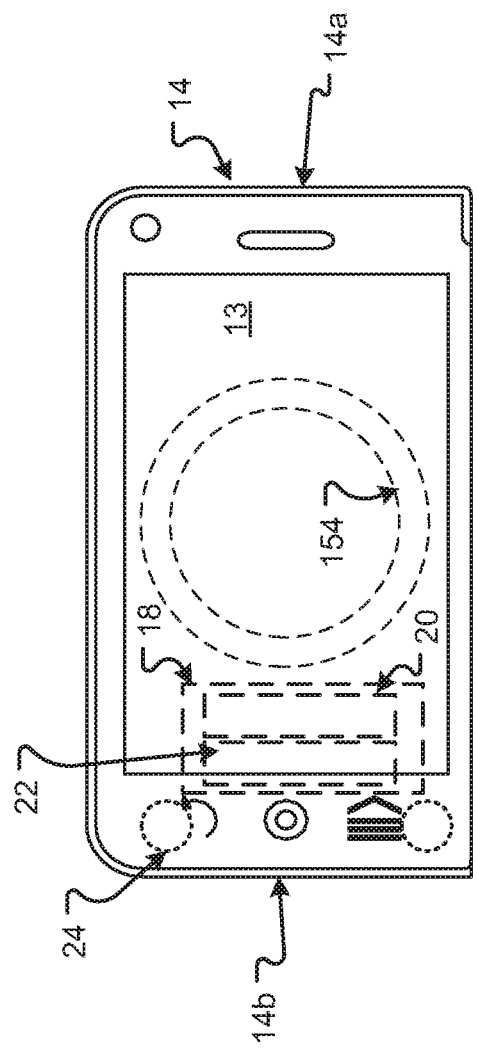
FIG. 1B shows another simplified diagram of a docking system 10, having a portable electronic device 14, in accordance with embodiments of the present disclosure.

A docking system 10 is shown in FIGS. 1A and 1B. The docking system 10 can include a docking station 12 and a portable electronic device 14 that is capable of "docking" or interfacing with the docking station 12. The docking station 12 can provide a platform for quickly and easily coupling the portable electronic device 14 to another system or device, for example, a second computer, a power source, or one or more peripheral devices (e.g., a monitor, a keyboard, speakers, printers, etc.). Thus, by using the docking station 12, a user does not have to separately connect each of these various systems/devices with the portable electronic device 14.

The portable electronic device 14 may be any electronic device that is easily transported by a user. By way of example, the portable electronic device 14 may generally correspond to computing devices, such as, laptops, tablet computers, personal digital assistants (PDAs), media players (e.g., music players, video players, or game players), cell phones, smart phones, Global Positioning System (GPS) devices, electronic readers, and/or the like.

The portable electronic device 14 can be a hand-held computing device. The hand-held electronic device may be directed at one-handed operation and/or two-handed operation. In one-handed operation, a single hand is used to both support the device and to perform operations with a user interface provided by the hand-held device. Cellular phones, PDAs, cameras, media players, and GPS units may be examples of portable devices that can be operated with one hand. In the case of a cell phone, for example, a user may grasp the phone in one hand between the fingers and the palm and use the thumb to make entries using keys, buttons, or a touch screen. In two-handed operation, one hand is used to support the device while the other hand performs operations with a user interface or, alternatively, both hands support the device and perform operations. Tablet PCs, electronic book readers, and game players may be examples of portable devices that are typically operated with two hands. In the case of the tablet PC, for example, the user may grasp the tablet with one hand and make entries in the tablet using the other hand, or alternatively grasp the tablet in both hands and make entries using either or both hands while holding the tablet PC.

Figure 4A:
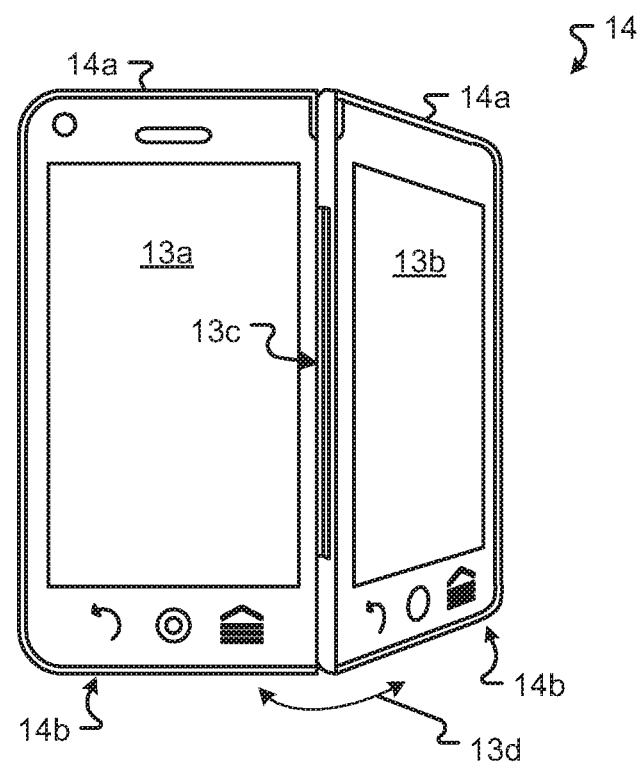
FIGS. 4A and 4B show a portable device 14 that is foldable, in accordance with one embodiment of the present disclosure.
Figure 4B:
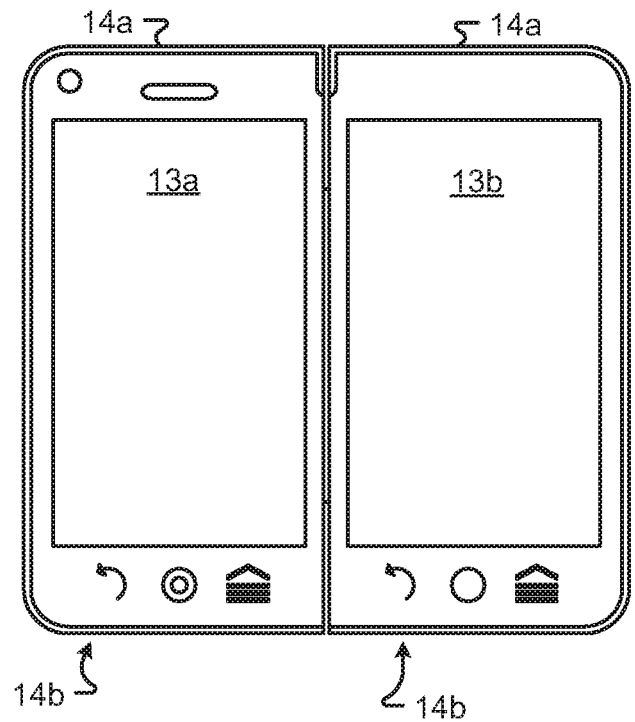

The portable electronic device 14 may correspond to those portable electronic devices that provide information in a picture frame format. A device that provides a picture frame format can be substantially planar and configured with a display that fills up substantially an entire surface of the portable electronic device 14. Such a display 13 may extend edge to edge or it may fit within a small bezel of the housing at the edge of the device 14. The display may have a variety of different configurations depending on the type device 14. If the device 14 is wide, the display 13 may have a traditional aspect ratio of about 4:3. If the device 14 is elongated, the display 13 may have an aspect ratio of 16:9. Examples of picture frame electronic devices are tablet PCs, and electronic book readers. It should be noted, however, that almost any of the devices mentioned above may be configured in this manner. Additionally, portable devices 14 may include foldable segments such that there are two display screens 13a and 13b (i.e., one on each of the segments, as shown in FIG. 4A et seq.) which face in different directions when the device 14 is folded about folding mechanism 13c according to the arc 13d, and which face in a same direction when the device is unfolded.

Referring to the docking station 12, the docking station 12 may be a standalone unit that communicates with other devices or systems through wired or wireless connections, or alternatively, the docking station 12 may be integrated directly into one of the other devices or systems. The docking station 12 may include connectors, jacks, ports, or transceivers that provide external communication connections to the other devices or systems, such connections provided via, e.g., induction coils and resonant inductive coupling (as one skilled in the art will understand), or via wireless communication components for implementing, e.g., wireless fidelity (WIFI), BLUETOOTH, time division multiple access (TDMA), Global System for Mobile Communications (GSM), or code division multiple access (CDMA) communications. In the case of an integrated docking station, the docking station 12 may be hard wired directly to the components of a host device (e.g., computer equipment provided in a kiosk).

In either case, the docking station 12 may include one or more holding systems 15 for receiving and supporting the portable electronic device 14 when the portable electronic device 14 is docked. The docking station 12 can be configured so that each holding system 15 supports a portable electronic device 14 in a predetermined position so that the top (14a) of the portable device fits into the corresponding recess 15a of the holding system 15. Note that for each holding system 15, there are one or more corresponding inductive coils 152 (described further hereinbelow) residing beneath the holding system's surface for charging of (and/or data transfer to) portable devices 14 having a corresponding inductive coil 154 (as shown in FIG. 1A and described further hereinbelow) as one skilled in the art will understand. Further note, the portable device 14 may also be operably positioned in the holding systems 15 with the device's bottom (14b) in the holding system's recess 15a since each of the induction coils 152 and 154 are substantially in the center of their planar extents. An embodiment of the docking station 12 may include the power control features described in U.S. Pat. No. 5,325,046, which is incorporated herein by reference for all that it teaches and for all purposes.

To connect operatively the portable electronic device 14 with the docking station 12, the docking station 12 may include an interface system 16 (provided with docking station 12) that interfaces with a corresponding interface system 18 on the portable electronic device 14 when the portable electronic device 14 is set on or near the docking station 12. The interface systems 16 and 18 may vary widely and may include various mechanisms for transferring data and/or power between the portable electronic device 14 and the docking station 12. For example, each of the systems 16 and 18 may include a power transfer mechanism 20 and a data transfer mechanism 22. When docked, the data transfer mechanisms 22 transfer data between the docking station 12 and the portable electronic device 14. Data can therefore be uploaded or downloaded to and from the portable electronic device 14. Furthermore, the power transfer mechanisms 20 transfer power from the docking station 12 to the portable electronic device 14. The power transfer can be used to power and/or charge the portable electronic device 14 when it is docked. In some cases, the data and power mechanisms are separate components while in other cases the data and power mechanisms are integrated together.

The interfacing systems 16 and 18, including both the data mechanisms 22 and the power mechanisms 20, can be embodied in various forms and combinations including contact based and non-contact based platforms. By way of example, contact based platforms may include electrical contacts that are capable of transferring data and/or power when the electrical contacts are electrically engaged or in contact with one another. Non-contact based platforms, on the other hand, may include inductive devices, optical devices, or wireless devices that are capable of transferring data and/or power without mating contact.

With regards to non-contact platforms, inductive coils can be placed in each device to transfer both power and data. The inductive coils 152 and 154 are typically hidden from view behind the housings of each device and therefore they are more aesthetically pleasing than electrical contacts, which need to be exposed in order to operate effectively. Furthermore, inductively based systems are more robust than electrical contacts. For example, there are no contacts to wear out and/or oxidize.

Wireless devices may include receivers, transmitters, and transceivers of various types including radio frequency (RF), BLUETOOTH™, 802.11 UWB (ultra wide band), and the like. Like inductive devices, wireless devices are typically hidden from view and therefore are more aesthetically pleasing and robust (e.g., fully enclosed with no lines, or breaks in the surface of the housings). Optical devices may include a light source and light detector for data, and a light source and photovoltaic device(s) for power. Each of these devices can be positioned behind a translucent region of the housing so as to allow proper communication therebetween. With regards to data, an infrared (IR) link may be used. The docking system 10 (and in particular, the docking station 14) may use any combination of contact and non-contact platforms in order to serve the needs of the portable electronic device 14.

Both power and data can be transferred with non contact based platforms, and more particularly, non contact based platforms that are enclosed, such as, inductive based systems and wireless systems. In inductive based systems, the docking station 12 includes the primary coil (152) and the portable electronic device 14 includes the secondary coil (154). In wireless systems, both the docking station 12 and the portable electronic device 14 can include their own transceiver that both transmits and receives data. In particular, both the docking station 12 and the portable electronic device 14 may include a WIFI transceiver.

The WIFI transceiver 21 for the docking station 12 may transfer data and power via the inductance-based system. For example, low frequency electrical current may be passed from the primary coil to the secondary coil to power or charge the portable electronic device 14 and high frequency current may be passed from one coil to the other to send/receive data. The data and power inductors may be separate, integral or they may be superimposed on one another. In another implementation, power is transferred via an inductance-based system and data is transferred via a wireless system. The combination of inductance and wireless components provides an efficient way to transfer both power and data while keeping both the docking station and portable electronic device fully enclosed and eliminates connectors.

In some cases, the interfacing systems 16 and 18 include their corresponding induction coils 152 and 154. Accordingly, such interfacing systems may need to be properly aligned in order to ensure proper connections and therefore efficient power and data transfer between the docking station 10 and the portable electronic device 14. This alignment may be especially important for electrical contacts, inductive transformers, and optical devices, and less important for wireless devices. Accordingly, the docking station 12 may include one or more alignment features 24 that help register or align the portable electronic device 14 with the docking station 12 and further to help align the corresponding interface mechanisms with one another. The alignment features 24 may be fixed or adjustable, and may include such elements as pins, shelves, guides, reference surfaces, keyways, and the like. The alignment features 24 may also provide visual alignment clues or fiduciaries for helping the user position the portable electronic device 14 on the docking station 12.

Although not shown, in some cases, the docking system 10 may further include retention mechanisms for securing the portable electronic device 14 to the docking station 12. By way of example, the retention mechanisms may include one or more magnets, snaps, latches, catches, friction couplings, detents, tabs, slots, and/or the like. In some cases, the docking system 10 may even include a lock so that portable electronic device 14 is only removable if the user has the proper key, combination or access code.

Alternatively, multiple interface mechanisms may be used to ensure coupling between the docking station and the portable electronic device. For example, there may be two dock side interface mechanisms, one for horizontal orientations and one for vertical orientations.

Figure 2:
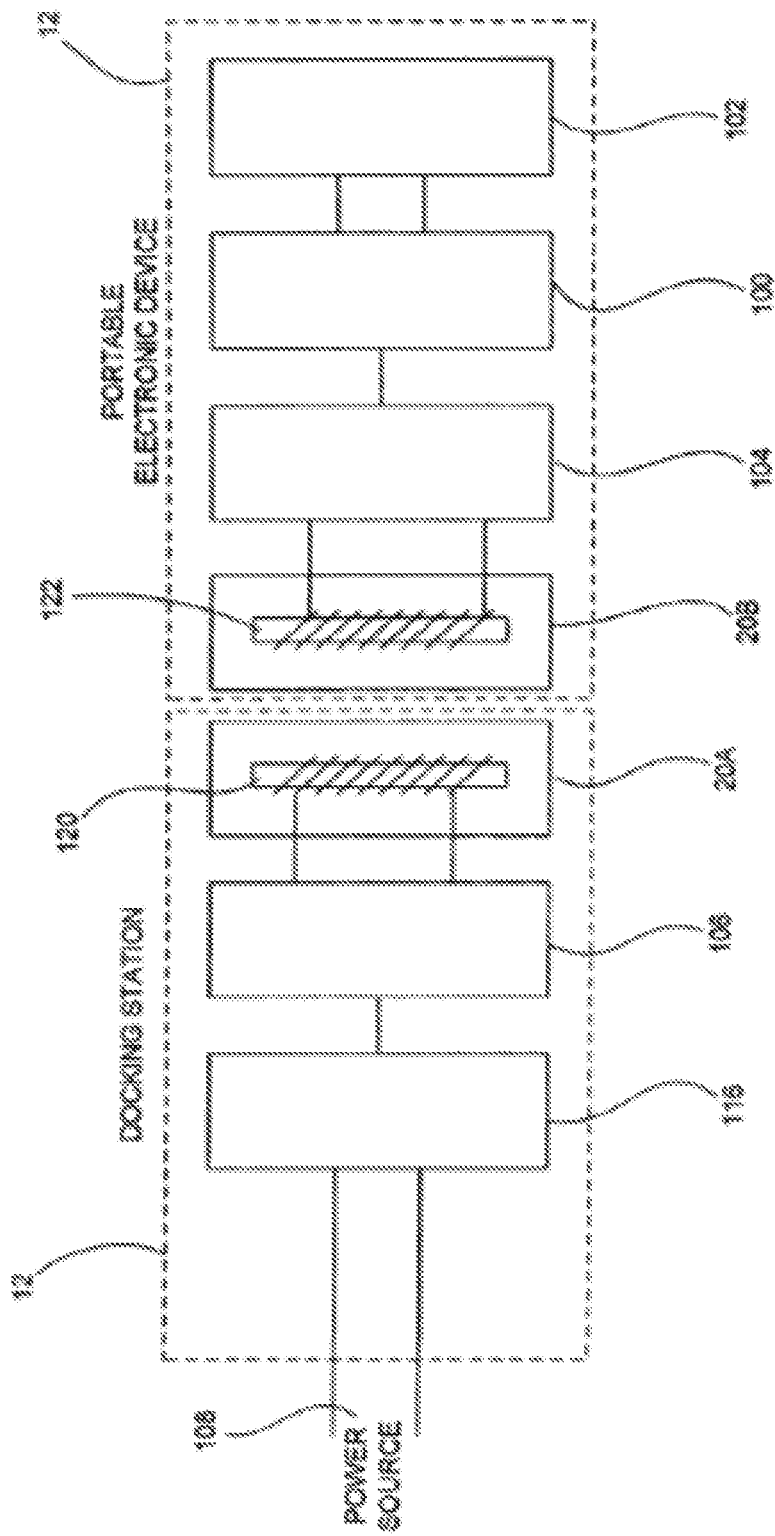
FIG. 2 is a diagram illustrating the non-contact adjacency for transmitting data and/or power between an induction coil 152 in the docking station 12 and a mating induction coil 154 in a portable device 14 in accordance with embodiments of the present disclosure. However, it is within the scope of the present disclosure for each of the docking station 12 and the portable device 14 to include a plurality of such mating induction coils.

Referring to FIGS. 2 and 3, a docking system 10 (and in particular, the docking stations 12) is shown in greater detail. Each of the interface systems 16 can include power transfer mechanism 20 operably connected to their corresponding induction coils 152 that are configured to be aligned with the induction coil 154 of a portable device 14.

Referring to FIG. 2, when the portable device is properly aligned with a holding system 15, the power transfer mechanism 20B of the portable electronic device 14 is operatively coupled to a power management circuit 100 that controls the power operations of the portable electronic device 14. The power management circuit 100 may, for example, control power to various mechanisms within the portable electronic device 14. The power may be used to operate the portable electronic device 14 and/or to recharge a battery 102 of the portable electronic device 14. By way of example, the power management circuit 100 may be a dedicated power controller or may be part of a main processor of the portable electronic device.

If AC power is delivered through power transfer mechanisms 20, the portable electronic device 14 may further include a rectifier 104 that converts the AC power to DC power and/or adjusts DC power to an acceptable level.

The power transfer mechanism 20A of the docking station 12 is operatively coupled to a power management circuit 106 that controls power transmissions through the docking station 12. The power management circuit 106 is operatively coupled to a power source 108. The connection to the power source 108 may be accomplished through a power cable 110 that connects to a power outlet via a power plug.

If the docking station 12 is configured to transmit DC power to the electronic device 14, the docking station 12 may further include a transformer/rectifier for converting AC power to DC power and vice versa, which can be used directly by the portable electronic device 14.

In FIG. 2, the opposing power transfer mechanisms 20 are inductively based and therefore the docking station 12 includes a primary inductive coil 120 and the portable electronic device 14 includes a secondary inductive coil 122 that interact to form a two part transformer. When the portable electronic device 14 is docked, the complete transformer is created, i.e., the inductors 120 and 122 are aligned along their axes and placed side by side without making electrical or mechanical contact. During power transfer, current is made to flow through the primary inductive coil 120. The resulting magnetic flux induces a current in the secondary inductive coil 122 thereby completing the circuit. AC power received by the secondary inductive coil 122 can be converted to DC power for operating the portable electronic device 14 and/or for storage in the battery 102.

In one embodiment, the inductive coils 120 and 122 are rotationally symmetric about an axis projecting in a direction that is normal to the parallel planes of the induction coils 152 and 154 when operatively coupled. Note that the inductive coils may be circular as shown or alternatively square, octagon, or the like.

FIG. 3 is a side elevation view, in cross section, of an inductively based charging system 150, in accordance with one embodiment of the present disclosure. The charging system 150 may be used in any of the embodiments described above. The docking station 12 can include a first inductive coil 152, and the portable electronic device 14 can include a second inductive coil 154. The first inductive coil 152 is disposed inside the platform 26 behind the front wall 156 of the platform 26. The second inductive coil 154 is disposed inside the housing 158 of the portable electronic device 14 behind the back wall 160 of the portable electronic device 14. When the portable electronic device 14 is docked with the docking station 12, as, for example, when the back wall 160 of the device 14 is placed against the front wall 156 of the platform 26, the first and second coils 152 and 154 are juxtaposed and aligned along an axis of polar symmetry 162. This ensures an efficient coupling between the two coils 152 and 154. The inductive coils 152 and 154 may be aligned using any of the embodiments mentioned above.

To elaborate, the coils 152 and 154 generally include a permeable core 170 and wire windings 172 wrapped around the permeable core 170. The capacity of the inductor 152/154 is controlled by various factors including, the number of coils, the material the coils are wrapped around (the core), the cross sectional area of the coil. In small hand-held computing device such as cell phones, PDAs or media players, the inductive coils are generally configured to transmit between about 3-5 Watts of power. In larger hand-held computing devices such as Tablet PCs, the inductive coils are generally configured to transmit between about 15-25 Watts of power. One advantage of planar like electronic devices is that larger inductive coils may be used, i.e., spread across the planar surface.

In one embodiment, the inductive coils 152 and 154 are circular and further toroidal or doughnut shaped in order to ensure rotational symmetry about the axis 162 when the portable electronic device 14 is placed on the docking station 12.

The manner in which the portable electronic device 14 is removably attached may be widely varied. By way of example, snaps, latches, catches, lips, slots, tabs, locks, etc. may be used. When detached, the portable electronic device 14 can be operated as a remote device independent of the docking station 12. When attached, the portable electronic device 14 may be temporary fixed to the rotational platform 204 and therefore the portable electronic device 14 becomes an extension of the docking station 12. To change the orientation of the portable electronic device 14, the rotational platform 204, which now carries the portable electronic device 14, rotates around the rotational axis of the axle arrangement. That is, the portable electronic device 14 is capable of rotating with the rotational platform to support the various orientations of the portable electronic device 14.

In one embodiment, the docking station 10 serves as a hub for downloading content onto the portable electronic device 14. For example, the portable electronic device 14 may correspond to a video player, and the docking station 10 may serve as a location for downloading video such as movies onto the video player. The portable electronic device 14 may correspond to an electronic book, and the docking station 10 may serve as a location for downloading book content onto the electronic book. The portable electronic device 14 may correspond to a music player, and the docking station 10 may serve as a location for downloading songs onto the music player. The portable electronic device 14 may correspond to a tablet, and the docking station 10 may serve as a location for accessing the internet or connecting to peripheral devices such as printers, fax machines, scanners, and the like.

The docking system 12 may include a number of usability features, like audible and tactile alerts provided by components therein. In particular, when the portable device 14 is correctly placed on one of the holding systems 15, such components may communicate with the portable device 14 for initiating such alerts from the portable device 14. Thus, a user may hear a distinctive tone, and feel a quick vibration when the portable device 14 is properly positioned within the holding system 15.

The docking system 12 may also include LED status indicators that will give a progress report on charging the portable device 14. For example, a blue light may indicate that the docking station 12 is plugged in, an orange light may indicate that it's ready to charge one or more portable devices 14, a flashing green light may be used to provide an indication a corresponding holding system 15 is charging a portable device 14 residing therein, and a solid green light may be used to indicate that charging of such a portable device 14 is complete. Moreover, note that similar indicator lights may be used for identifying when data is being transmitted, which direction it is being transmitted, when such transmissions are complete, when (and/or what type of) data error has been detected during a transmission. Such status indicators may be provided in iconic and/or textual form on a display as one skilled in the art will understand.

The docking station 12 may further include a mass data storage unit including a mass data storage media (e.g., an optical or magnetic data disk), or a mechanism for allowing a user to insert such a mass data storage media (such a mechanism being, e.g., a DVD/CD reader/writer, and/or one or more USB ports 160 as shown in FIG. 1, etc.). Additionally, the docking station 12 may include a port replicator 164 (FIG. 1) for providing communication ports such as serial and parallel ports for cable connections of, e.g., computers and display monitors.

In one embodiment, and as mentioned above, the portable device 14 may be a portable computer (e.g., laptop or tablet). In such case, instead of (or in addition to) the docking station 12 having the holding systems 15 shown in FIG. 1, the docking station 12 may include one or more positioning features for properly positioning such a portable computer across the entire width W (FIG. 1A) of the docking station 12. Note that appropriately connecting to such a portable computer for data transfer and/or power transfer may require a further induction coil 168. In one embodiment, in order to accommodate a greater variety of the portable devices 14, one or more of the induction coils 152 and 168 may be positionable within the docking station 12. For example, an induction coil positioning mechanism (not shown) could vary a position of such an induction coil according to output from a detector (not shown) within the docking station 12, wherein the detector detects an acceptable or near optimal induction coil position for effective data/power transfer with a portable device 14. Further, a user interface on the portable electronic device 14 may provide visual indicia to the user to help "steer" the portable electronic device 14 to the optimal or near optimal position on the docking station 10. For example, a series of arrows may appear on the user interface showing the user how to move the portable electronic device 14 onto the docking station 10.

If only data communication is desired, one or more portable devices 14 may wirelessly access docking station 12 remotely via, e.g., WIFI transceiver 21. Moreover, for computational environments where security computational resources (e.g., databases, programs, etc.) is sufficiently important, the portable devices 14 authorized to access the docking station 12 via, e.g., the WIFI transceiver (or another wireless transceiver) may include wireless communication channels that may be "keyed," such that authorization "key" data is communicated prior to the docking station providing access to various computational facilities, e.g., printers, databases, corporate documents, etc. Thus, there may be a unique such "key" for each distinct portable device 14 that can access the various computational facilities via the docking station 12. Moreover, such access may vary depending on the access authorization that such a "key" corresponding to a particular portable device 14 allows. The key may be part of a security system or protocol, for example, pretty good privacy (PGP) or other type of key-based security system.

In certain environments, where security is important, a visitor to a secure site may provide his/her portable device 14 in one of the holding systems 15 of the docking station 12, and an employee (or other authorized person) may provide his/her portable device 12 in the other holding system 15 of the docking station, and one or more of the access authorizations that the employee (or other authorized person) is allowed to transfer to a visitor may be transmitted to the visitor's portable device 14 and a record of the portable device of the employee (or other authorized person) authorizing such visitor access may be logged. Thus, the visitor may then be able to use his/her portable device 14 to, e.g., access various printers, databases, rooms (much as an access RFID tag), etc.

The advantages to such a feature are at least as follows:
1. Such visitor authorization can be automatically logged together with whom authorized such access;
2. Such visitor authorization can be tailored to the specific computational facilities of an organization that the visitor needs to access (e.g., a marketing database, but not corporate personnel files);
3. Such visitor authorization can automatically expire at a given time, or only allow access to certain facilities at designated times;
4. Access to certain facilities may require further identification such as a thumb print, etc. and smart phones, tablets, laptops as well as other such portable devices 14 are likely to have the capabilities to transmit such identification data without substantial investment in infrastructure for obtaining such further identification;
5. Such visitor authorization may prevent the visitor from phoning, emailing, messaging etc. to a communication device outside the secure site, at least for a time the visitor is at the secure site;
6. Such visitor authorization may prevent storage of, e.g., photos, scanned documents on the visitors portable device 12, at least for a time the visitor is at the secure site; and,
7. Such visitor authorization may automatically delete any photos, scanned documents, or other documents stored on the visitor's portable device 12 immediately after the visitor leaves the secure site, wherein, e.g., timestamps on such data is used to determined what (if anything) would be deleted.

Figure 5:
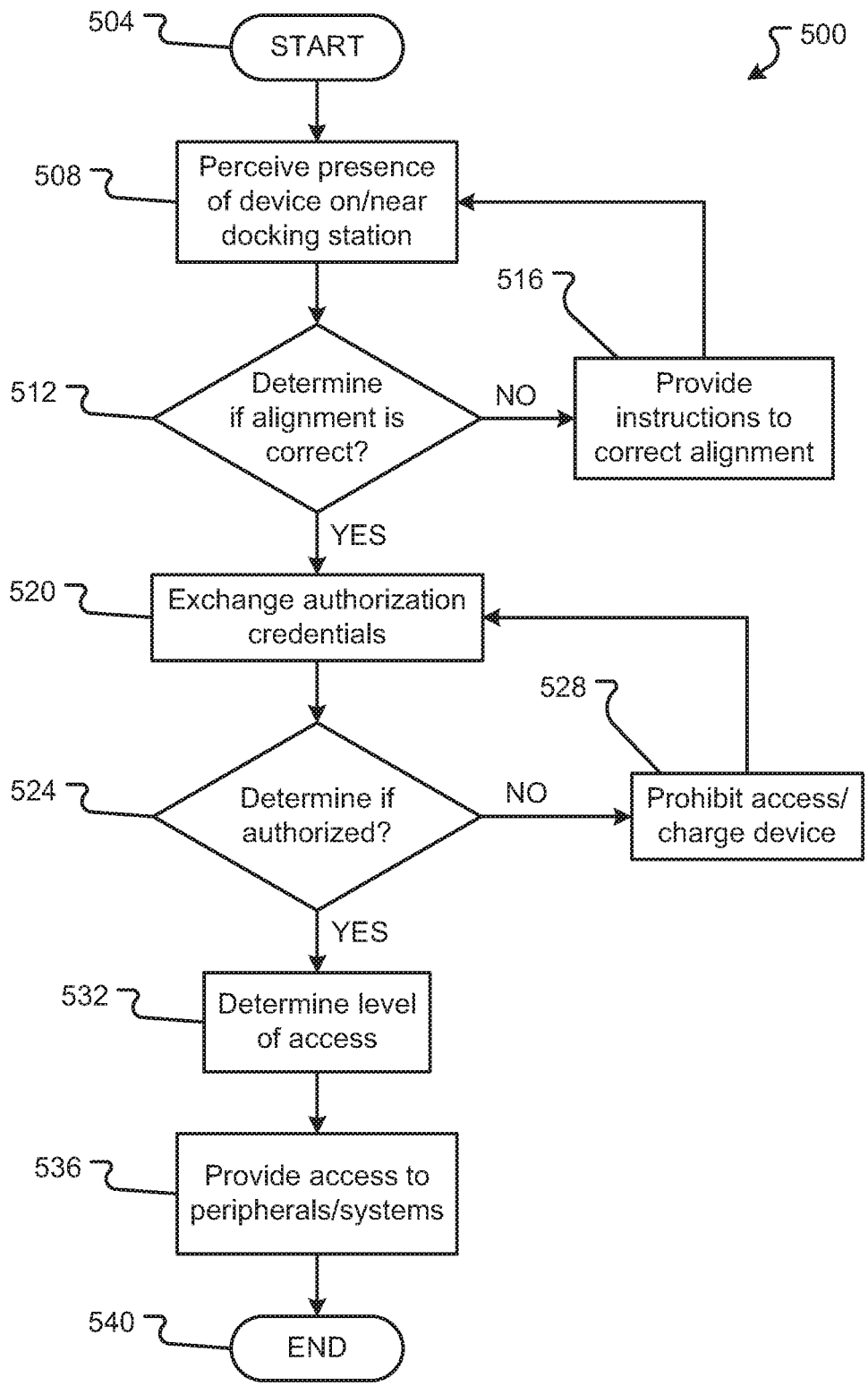
FIG. 5 is a process diagram of an embodiment of a method for docking a portable device.

An embodiment of a method 500 for providing a docking system and access to peripherals is shown in FIG. 5. While a general order for the steps of the method 500 is shown in FIG. 5. Generally, the method 500 starts with a start operation 504 and ends with an end operation 540. The method 500 can include more or fewer steps or can arrange the order of the steps differently than those shown in FIG. 5. The method 500 can be executed as a set of computer-executable instructions executed by a computer system and encoded or stored on a computer readable medium. Hereinafter, the method 500 shall be explained with reference to the systems, components, modules, software, data structures, user interfaces, etc. described in conjunction with FIGS. 1-4B.

An interface system 16 of a docking station 10 may perceive a portable device 14 is either on or near the docking station 10, in step 508. A signal or electrical/magnetic field may be detected by a power transfer mechanism 20 or other sensor/receiver. The presence of such a field or signal may be communicated to the interface system 16. Further information may then be communicated by the power transfer mechanism 20 or the data transfer mechanisms 22 to the interface system 16.

From the additional information, the interface system 16 may determine if an alignment of the portable device 14 is correct, in step 512. Alignment of the inductive coils is important to provide a current in the secondary coil 154. Thus, the interface system 16 can receive information from the power transfer mechanism 20 or the data transfer mechanisms 22 to assess the alignment. For example, the power transfer mechanism 20 may perceive a field originating in coil 154 and determine if the strength of the field is maximized at the current location. In another example, the portable device 14 can provide data regarding the strength of the field produced by the primary coil 152 to the data transfer mechanisms 22 for communication to the interface system 16. In still other examples, one or more other sensors, e.g., light sensing diodes, proximity sensors, etc., can determine the position of the portable device 14 on the docking station 10 and provide that information to the interface system 16. If the alignment is correct, the method 500 can proceed YES to step 520. However, if the alignment is not correct, the method 500 can proceed NO to step 516.

In step 516, the interface system 16 can provide indications or instructions to the user to correct the alignment. For example, a user interface or indicator on the docking station can provide visual indicia of how to correct the alignment. The visual indicia can include lighted diodes positioned above, below, right, and left of the docking area 15. The diodes may light to direct the user to move the portable device 14 toward the diode. Further, the diodes may change how the diode is lit to indicate a degree or amount of movement. If a diode is blinking slowly, the amount movement may be great, and, when the diode is blinking quickly, the amount of movement may be smaller. Likewise, the interface system 16 may communicate information to the portable device 14 through the data transfer mechanisms 22 to provide a user interface on the portable device 14 that indicates how to position the portable device 14 on the docking station 10. For example, an arrow may appear that indicates in how to orient the portable device 14 (left, right, up, down, rotate, flip over) on the docking station 10. Other visual indicia may be provided as understood in the art. The interface system 16 may then check again to determine if the position is correct.

In step 520, the portable device 14 and the docking station 10 can exchange authorization credentials. Here, the portable device 14 may provide a key or other security credentials to the interface system 16 of the docking station 10. The docking station 10 may store security credentials. Once received, the interface system 16 can compare the received credentials to credentials stored by the docking station 10. Likewise, the portable device 14 may receive and check credentials provided by the docking station 10. Either or both the docking station 10 and/or the portable device 14 can determine if access or docking is authorized. In step 524. The determination is made by determining if the received key or credentials compare favorably to a stored key or credentials. If the access or docking is authorized, the method 500 proceeds YES to step 532. If the access or docking is not authorized, the method 500 proceeds NO to step 528.

The portable device 14 or docking station 10 can prohibit access or docking, in step 528. An indication may be given to the user that the access or docking is not allowed. Then, portable device 14 or docking station 10 may prevent any access to systems, memory, data, or other components. However, the docking station 10 may still charge the portable device 14 using the power transfer mechanism 20. Thus, only data transfers may be prohibited by disabling the data transfer mechanisms 22 while energizing the power transfer mechanism 20.

In step 532, the interface system 16 may determine a level of access provided to the portable device 14 (the portable device 14 may also determine a level of access to the portable device 14). Here, the interface system 16 can determine the key or credentials used or determine some other form of identification for the portable device 14. Based on the information, the interface system 16 can access information about what the portable device 14 is allowed to access. The access information may be stored in the docking station 10. This access information may be different for each portable device 14 that docks with the docking station 10. Thus, some portable devices 14 may have full access to all peripherals, data, etc. Other portable devices 14 may only access peripherals but not access any stored data. The configurations of what may be accessed are numerous and are understood by those skilled in the art.

After determining the type of access, the portable device 14 or docking station 10 can provide the access to the peripherals, data, systems, components, etc., in step 536. Thus, the portable device 14 or docking station 10 may then communicate through the data transfer mechanisms 22. Further, power may then be transferred to the portable device 14 through the power transfer mechanisms 20, if not already completed.

Figure 6:
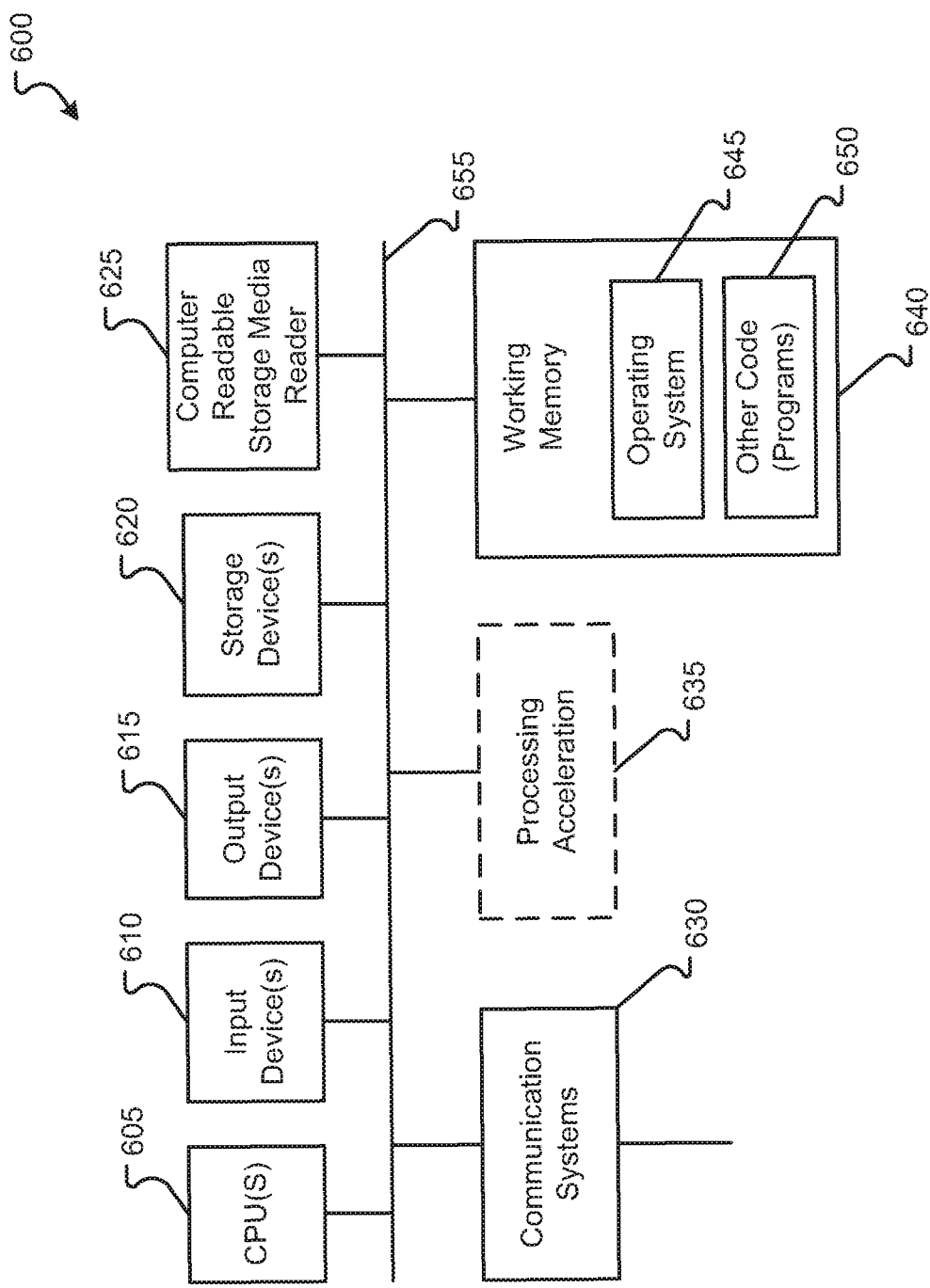
FIG. 6 is a block diagram of an embodiment of a computing system which may represent the docking station or the portable device.

FIG. 6 illustrates one embodiment of a computer system 600 upon which the docking station 10, the portable device 14, or other systems described herein may be deployed or executed. The computer system 600 is shown comprising hardware elements that may be electrically coupled via a bus 655. The hardware elements may include one or more central processing units (CPUs) 605; one or more input devices 610 (e.g., a mouse, a keyboard, etc.); and one or more output devices 615 (e.g., a display device, a printer, etc.). The computer system 600 may also include one or more storage device 620. By way of example, storage device(s) 620 may be disk drives, optical storage devices, solid-state storage device such as a random access memory ("RAM") and/or a read-only memory ("ROM"), which can be programmable, flash-updateable and/or the like.

The computer system 600 may additionally include a computer-readable storage media reader 625; a communications system 630 (e.g., a modem, a network card (wireless or wired), an infra-red communication device, etc.); and working memory 640, which may include RAM and ROM devices as described above. In some embodiments, the computer system 600 may also include a processing acceleration unit 635, which can include a DSP, a special-purpose processor and/or the like.

The computer-readable storage media reader 625 can further be connected to a computer-readable storage medium, together (and, optionally, in combination with storage device(s) 620) comprehensively representing remote, local, fixed, and/or removable storage devices plus storage media for temporarily and/or more permanently containing computer-readable information. The communications system 630 may permit data to be exchanged with the network 620 and/or any other computer described above with respect to the system 600. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 600 may also comprise software elements, shown as being currently located within a working memory 640, including an operating system 645 and/or other code 650, such as program code implementing the servers or devices described herein. It should be appreciated that alternate embodiments of a computer system 600 may have numerous variations from that described above. For example, customized hardware might also be used and/or particular elements might be implemented in hardware, software (including portable software, such as applets), or both. Further, connection to other computing devices such as network input/output devices may be employed.

While this present disclosure has been described in terms of several preferred embodiments, there are alterations, permutations, and equivalents, which fall within the scope of this present disclosure. It should also be noted that there are many alternative ways of implementing the methods and apparatuses of the present disclosure. It is therefore intended that the following appended claims be interpreted as including all such alterations, permutations, and equivalents as fall within the true spirit and scope of the present disclosure.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a tablet-like device, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, hand-held devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A docking system comprising a docking station, the docking station comprising:
 a holding system comprising a display element and capable of supporting a portable device;
 an interface system operable to interface with the portable device, the interface system operable to provide one or more of data and power to the portable device without a physical electrical connection;
 a memory; and
 a processor in communication with the memory and the interface system, the processor programmed to:
   detect a presence of the portable device on the holding system;

energize a first inductive coil of the docking station to create a first magnetic field, the first magnetic field inducing a first current and a second magnetic field in an inductive coil of the portable device;

determine a strength of the second magnetic field is less than a maximum strength;

in response to determining the strength of the second magnetic field is less than the maximum strength, determine the inductive coil of the portable device is not aligned with the first inductive coil of the docking station;

generate alignment directions for the portable device based on the determination that the inductive coil of the portable device is not aligned with the first inductive coil of the docking station;

display the alignment directions on the display element;

determine the strength of the second magnetic field is at a maximum strength;

in response to determining the strength of the second magnetic field is at the maximum strength, determine the inductive coil of the portable device is aligned with the first inductive coil of the docking station;

based on the determination that the inductive coil of the portable device is aligned with the first inductive coil of the docking station, exchange authorization credentials between the portable device and the docking station;

based on the authorization credentials, determine the portable device is authorized;

based on the determination that the portable device is authorized, determine, by accessing information associated with the portable device stored in the memory, a level of access to provide to the portable device; and provide, with the interface system, the portable device access to at least one of a system connected to the docking station and data accessible by the docking station based on the determined level of access.

2. The docking system of claim 1, wherein the interface system comprises a data transfer mechanism operable to receive wireless data from the portable device and transmit wireless data to the portable device.

3. The docking system of claim 1, wherein the interface system comprises a power transfer mechanism operable to wirelessly provide power to the portable device.

4. The docking system of claim 3, wherein the docking station further comprises a second inductive coil, wherein the processor is further programmed to energize the second inductive coil to create a third magnetic field, the third magnetic field inducing a second current in a second inductive coil of the portable device.

5. The docking system of claim 1, wherein the docking station further comprises visual indicia indicating a correct alignment for the portable device in the docking system.

6. The docking system of claim 1, wherein the docking station further comprises one or more connections to one or more other systems, devices, peripherals, and data storage.

7. The docking system of claim 3, wherein the power transfer mechanism is further operable to wirelessly provide data to the portable device.

8. A method comprising:
detecting, by a processor of a docking station, a presence of a portable device on a holding system of the docking station, wherein the holding system comprises a display element and is capable of supporting the portable device;

energizing, by the processor, a first inductive coil of the docking station to create a first magnetic field, the first magnetic field inducing a first current and a second magnetic field in an inductive coil of the portable device;

determining, by the processor, a strength of the second magnetic field is less than a maximum strength;

in response to determining the strength of the second magnetic field is less than the maximum strength, determine the inductive coil of the portable device is not aligned with the first inductive coil of the docking station;

generating, by the processor, alignment directions for the portable device based on the determination that the inductive coil of the portable device is not aligned with the first inductive coil of the docking station;

displaying, by the processor, the alignment directions on a display element of the holding system;

determining, by the processor, the strength of the second magnetic field is at a maximum strength;

in response to determining the strength of the second magnetic field is at the maximum strength, determining, by the processor, the inductive coil of the portable device is aligned with the first inductive coil of the docking station;

based on the determination that the inductive coil of the portable device is aligned with the first inductive coil of the docking station, exchanging authorization credentials between the portable device and the docking station;

based on the authorization credentials, determining the portable device is authorized;

based on the determination that the portable device is authorized, determining, by the processor, by accessing information associated with the portable device in memory of the docking station, a level of access to provide to the portable device; and providing, with an interface system of the docking station, the portable device access to at least one of a system connected to the docking station and data accessible by the docking station based on the determined level of access, wherein the interface system is operable to interface with the portable device and provide one or more of data and power to the portable device without a physical electrical connection.

9. The method of claim 8, wherein the authorization credentials include a security key sent from the portable device to the docking station.

10. The method of claim 9, wherein the processor compares the security key sent from the portable device to a security key stored in the memory of the docking station.

11. A non-transitory computer-readable medium having stored thereon computer-executable instructions, the computer-executable instructions configured to cause a processor of a docking station to execute a method for docking a portable device to the docking station, the method comprising:
detecting a presence of a portable device on a holding system of the docking station, wherein the holding system comprises a display element and is capable of supporting the portable device;

energizing a first inductive coil of the docking station to create a first magnetic field, the first magnetic field inducing a first current and a second magnetic field in an inductive coil of the portable device;

determining a strength of the second magnetic field is less than a maximum strength;

in response to determining the strength of the second magnetic field is less than the maximum strength, determine the inductive coil of the docking station;

generating alignment directions for the portable device based on the determination that the inductive coil of the portable device is not aligned with the first inductive coil of the docking station;

displaying the alignment directions on a display element of the holding system;

determining the strength of the second magnetic field is at a maximum strength;

in response to determining the strength of the second magnetic field is at the maximum strength, determine the inductive coil of the portable device is aligned with the first inductive coil of the docking station;

based on the determination that the inductive coil of the portable device is aligned with the first inductive coil of the docking station, exchanging authorization credentials between the portable device and the docking station;

based on the authorization credentials, determining the portable device is authorized;

based on the determination that the portable device is authorized, determining, by accessing information associated with the portable device in memory of the docking station, a level of access to provide to the portable device; and providing, with an interface system of the docking station, the portable device access to at least one of a system connected to the docking station and data accessible by the docking station based on the determined level of access, wherein the interface system is operable to interface with the portable device and provide one or more of data and power to the portable device without a physical electrical connection.

12. The computer-readable medium of claim 11, wherein the interface system comprises a data transfer mechanism operable to receive wireless data from the portable device and transmit wireless data to the portable device.

13. The computer-readable medium of claim 11, wherein the interface system comprises a power transfer mechanism operable to wirelessly provide power to the portable device.

14. The computer-readable medium of claim 13, wherein the docking station comprises a second inductive coil, wherein the method further comprises creating a third magnetic field, the third magnetic field inducing a second current in a second inductive coil of the portable device.

15. The computer-readable medium of claim 11, wherein the docking station comprises visual indicia indicating a correct alignment for the portable device in the docking system.

16. The method of claim 8, wherein the interface system comprises a data transfer mechanism operable to receive wireless data from the portable device and transmit wireless data to the portable device.

17. The method of claim 8, wherein the interface system comprises a power transfer mechanism operable to wirelessly provide power to the portable device.

18. The method of claim 17, wherein the power transfer mechanism is further operable to wirelessly provide data to the portable device.

19. The method of claim 17, wherein the docking station further comprises a second inductive coil, wherein the processor is further programmed to energize the second inductive coil to create a third magnetic field, the third magnetic field inducing a second current in a second inductive coil of the portable device.

20. The method of claim 8, wherein the docking station comprises visual indicia indicating a correct alignment for the portable device in the docking system.

* * * * *